United States Patent [19]

Wilkinson et al.

[11] Patent Number: 5,773,160
[45] Date of Patent: Jun. 30, 1998

[54] ELECTROCHEMICAL FUEL CELL STACK WITH CONCURRENT FLOW OF COOLANT AND OXIDANT STREAMS AND COUNTERCURRENT FLOW OF FUEL AND OXIDANT STREAMS

[75] Inventors: David P. Wilkinson, North Vancouver; Henry H. Voss, West Vancouver; Nicholas J. Fletcher, Vancouver, all of Canada; Mark C. Johnson, Pheonix, Ariz.; Eric G. Pow, Vancouver, Canada

[73] Assignee: Ballard Power Systems Inc., Burnaby, Canada

[21] Appl. No.: 721,214

[22] Filed: Sep. 26, 1996

Related U.S. Application Data

[63] Continuation-in-part of Ser. No. 699,568, Aug. 19, 1996, abandoned, which is a continuation of Ser. No. 265,414, Jun. 24, 1994, Pat. No. 5,547,776.

[51] Int. Cl.⁶ .................................................. H01M 8/04
[52] U.S. Cl. ................................. 429/13; 429/26; 429/30
[58] Field of Search ................................. 429/13, 26, 30

[56] References Cited

U.S. PATENT DOCUMENTS

| | | |
|---|---|---|
| 3,761,316 | 9/1973 | Stedman . |
| 4,129,685 | 12/1978 | Damiano ................................... 429/38 |
| 4,324,844 | 4/1982 | Kothmann ................................. 429/26 |
| 4,407,904 | 10/1983 | Uozumi et al. ........................... 429/26 |
| 4,444,851 | 4/1984 | Maru ......................................... 429/26 |
| 4,678,724 | 7/1987 | McElroy .................................... 429/34 |
| 4,686,159 | 8/1987 | Miyoshi ................................. 429/26 X |
| 4,729,932 | 3/1988 | McElroy .................................... 429/34 |
| 4,795,683 | 1/1989 | McElroy .................................... 429/13 |
| 4,826,742 | 5/1989 | Reiser ....................................... 429/33 |
| 4,973,530 | 11/1990 | Vanderborgh et al. ................... 429/13 |
| 4,988,583 | 1/1991 | Watkins et al. ........................... 429/30 |
| 5,108,849 | 4/1992 | Watkins et al. ........................... 429/30 |
| 5,230,966 | 7/1993 | Voss et al. ................................ 429/26 |
| 5,260,143 | 11/1993 | Voss et al. ................................ 429/13 |
| 5,262,249 | 11/1993 | Beal et al. ................................ 429/26 |
| 5,382,478 | 1/1995 | Chow et al. .............................. 429/26 |
| 5,397,655 | 3/1995 | Bette et al. ............................... 429/13 |
| 5,521,018 | 5/1996 | Wilkinson et al. ................... 429/30 X |
| 5,547,776 | 8/1996 | Fletcher et al. .......................... 429/13 |

FOREIGN PATENT DOCUMENTS

WO 96/24958  8/1996  WIPO .

Primary Examiner—Stephen Kalafut
Attorney, Agent, or Firm—McAndrews, Held & Malloy, Ltd.

[57] ABSTRACT

A fuel cell assembly within an electrochemical fuel cell stack has an anode layer and a cathode layer. A cooling layer is disposed adjacent the fuel cell assembly. Each layer comprises channels for directing a fluid stream from an inlet to a an outlet. The coolant stream channels extend such that, in operation, the coolest region of the cooling layer coincides with the region of the cathode layer having the highest concentration of oxygen (and/or the lowest water content), and the warmest region of the cooling layer coincides with the region of the cathode layer having the lowest concentration of oxygen (and/or the highest water content). The fuel stream channels extend such that, in operation, the fuel stream is directed to a region of the anode layer which coincides with the region of the cathode layer in which the oxidant stream has the lowest concentration of oxygen (and/or the highest water content) and is subsequently directed to a region of the anode layer which coincides with the region of the cathode layer in which the oxidant stream has the highest concentration of oxygen (and/or the lowest water content).

18 Claims, 9 Drawing Sheets

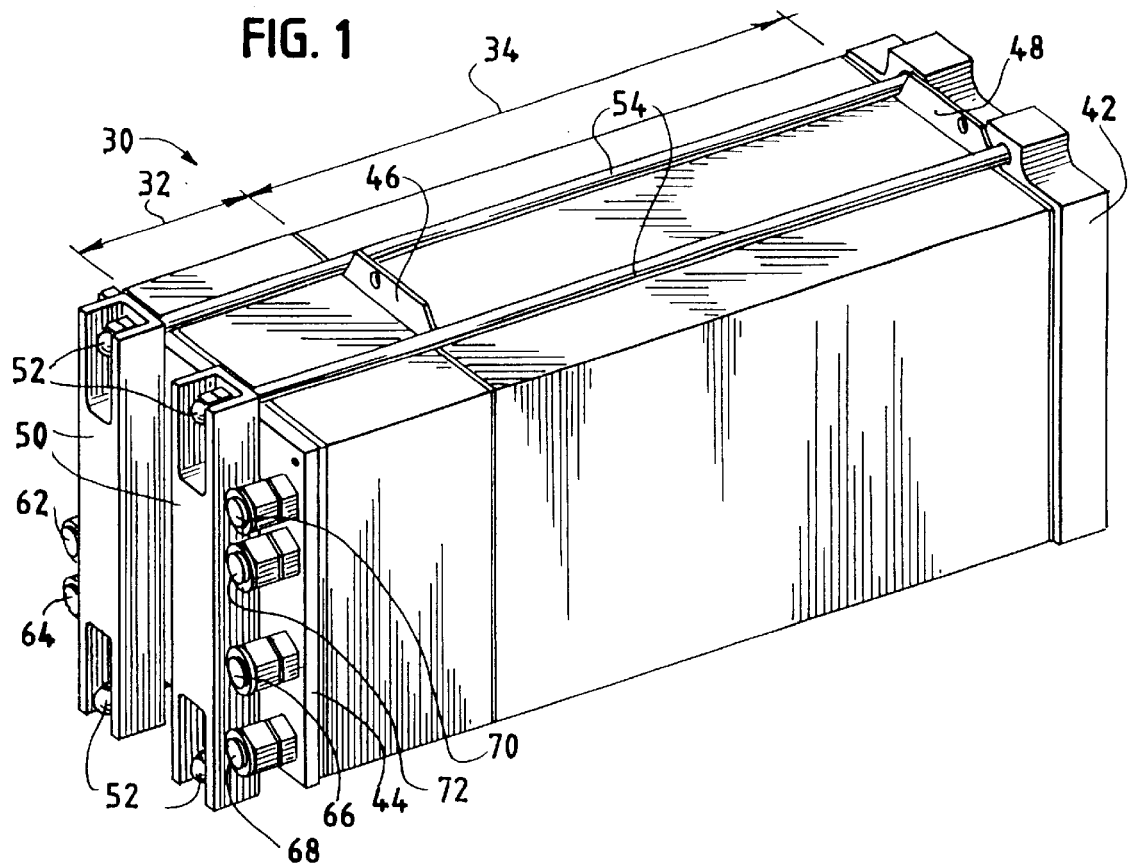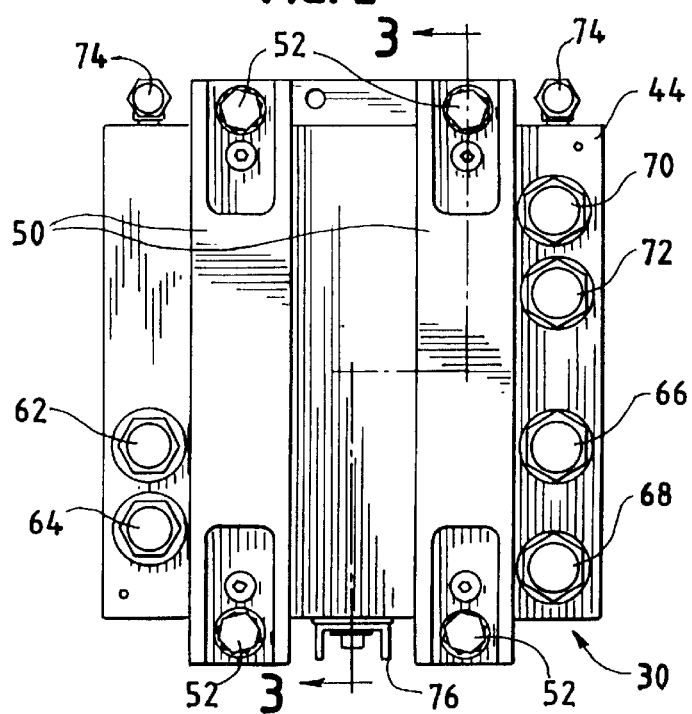

ELECTROCHEMICAL FUEL CELL STACK WITH CONCURRENT FLOW OF COOLANT AND OXIDANT STREAMS AND COUNTERCURRENT FLOW OF FUEL AND OXIDANT STREAMS

CROSS-REFERENCE TO RELATED APPLICATION

This application is a continuation-in-part of U.S. patent application Ser. No. 08/699,568 filed Aug. 19, 1996, entitled "Electrochemical Fuel Cell Stack With Concurrently Flowing Coolant And Oxidant Streams", now abandoned, which is a continuation of U.S. patent application Ser. No. 08/265,414 filed Jun. 24, 1994, entitled "Electrochemical Fuel Cell Stack With Concurrently Flowing Coolant And Oxidant Streams", now U.S. Pat. No. 5,547,776 issued Aug. 20, 1996. The '414 application is incorporated by reference herein in its entirety.

FIELD OF THE INVENTION

The present invention relates to electrochemical fuel cells. More particularly, the present invention relates to an electrochemical fuel cell stack in which the coolest region of each cooling layer substantially coincides with the region of the adjacent cathode layer in which the oxidant gas stream has the lowest water content, and the warmest region of each cooling layer substantially coincides with the region of the adjacent cathode layer in which the oxidant stream has the highest water content. The fuel stream is directed to a region of the anode layer which substantially coincides with the region of the cathode layer in which the oxidant stream has the highest water content and is subsequently directed to a region of the anode layer which substantially coincides with the region of the cathode layer in which the oxidant stream has the lowest water content.

BACKGROUND OF THE INVENTION

Electrochemical fuel cells convert fuel and oxidant to electricity and reaction product. Solid polymer electrochemical fuel cells generally employ a membrane electrode assembly ("MEA") consisting of a solid polymer electrolyte or ion exchange membrane disposed between two electrodes formed of porous, electrically conductive sheet material, typically carbon fiber paper. The MEA contains an electrocatalyst, typically a supported or unsupported platinum-based catalyst, at each membrane/electrode interface to induce the desired electrochemical reaction. The electrodes are electrically coupled to provide a path for conducting electrons between the electrodes to an external load.

At the anode, the fuel stream moves through the porous anode material and the fuel is oxidized at the anode electrocatalyst. At the cathode, the oxidant stream moves through the porous cathode material and the oxidant is reduced at the cathode electrocatalyst.

In solid polymer fuel cells employing hydrogen or methanol as the fuel and oxygen as the oxidant, the catalyzed reaction at the anode produces hydrogen cations (protons) from the fuel supply. The ion exchange membrane facilitates the migration of protons from the anode to the cathode. In addition to conducting protons, the membrane isolates the fuel stream, containing hydrogen or methanol, from the oxygen-containing oxidant stream. At the cathode electrocatalyst layer, oxygen reacts with the protons that have crossed the membrane to form water as the reaction product.

The anode and cathode reactions in hydrogen/oxygen fuel cells are shown in the following equations:

Anode reaction: 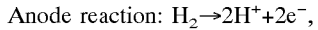$H_2 \rightarrow 2H^+ + 2e^-$,

Cathode reaction: 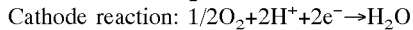$1/2 O_2 + 2H^+ + 2e^- \rightarrow H_2O$

In typical fuel cells, the MEA is disposed between two electrically conductive plates, each of which has at least one flow passage formed therein. These fluid flow field plates are typically formed of graphite. The flow passages direct the fuel and oxidant to the respective electrodes, namely, the anode on the fuel side and the cathode on the oxidant side. In a single cell arrangement, fluid flow field plates are provided on each of the anode and cathode sides. The plates act as current collectors, provide support for the electrodes, provide access channels for the fuel and oxidant to the respective anode and cathode surfaces, and provide channels for the removal of water formed during operation of the cell.

Two or more fuel cells can be connected together, generally in series but sometimes in parallel, to increase the overall power output of the assembly. In series arrangements, one side of a given plate serves as an anode plate for one cell and the other side of the plate can serve as the cathode plate for the adjacent cell. Such a series connected multiple fuel cell arrangement is referred to as a fuel cell stack, and is usually held together by tie rods and end plates. The stack typically includes manifolds and inlet ports for directing the fuel (for example, substantially pure hydrogen, methanol reformate or natural gas reformate, or methanol) and the oxidant (substantially pure oxygen or oxygen-containing air) to the anode and cathode flow field channels. The stack also usually includes a manifold and inlet port for directing the coolant fluid, typically water, to interior channels within the stack to absorb heat generated by the exothermic reaction of fuel and oxygen within the fuel cells. The stack also generally includes exhaust manifolds and outlet ports for expelling the unreacted fuel and oxidant streams, each carrying water, as well as an exhaust manifold and outlet port for the coolant exiting the stack. It is generally convenient to locate all of the inlet and outlet ports at the same end of the stack.

Hydrogen ion conductivity through ion exchange membranes generally requires the presence of water molecules between the surfaces of the membrane. The fuel and oxidant gas streams are therefore humidified prior to introducing them to the fuel cell to maintain the hydration of the membranes within the MEAs. Ordinarily, the fuel and oxidant gas streams are humidified by flowing each reactant stream on one side of a water vapor exchange membrane and by flowing deionized water on the opposite side of the membrane. Deionized water is preferred to prevent membrane contamination by undesired ions. In such membrane-based humidification arrangements, water is transferred across the membrane to the fuel and oxidant gas streams. NAFION is a suitable and convenient humidification membrane material in such applications, but other commercially available water exchange membranes are suitable as well. Other non-membrane based humidification techniques could also be employed, such as exposing a reactant gas stream directly to water in an evaporation chamber to permit the stream to absorb evaporated water.

It is generally preferred to humidify the fuel and oxidant gases at, or as close as possible to, the operating temperature and pressure of the fuel cell. The ability of gases such as air to absorb water varies significantly with changes in temperature, especially at low operating pressures. Humidification of the air (oxidant) stream at a temperature significantly below fuel cell operating temperature could result in a humidity level sufficiently low to dehydrate the membrane when the stream is introduced to the cell.

In a dilute oxidant stream, such as air, that is directed across the cathode layer of a fuel cell, there is generally an inverse relationship between the concentration of oxygen and the water content of the oxidant stream. In this regard, the highest concentration of oxygen will normally be found at the inlet of the oxidant stream to the cathode layer. Assuming that no additional sources of fresh oxygen are introduced to the oxidant stream between the inlet and the outlet, the concentration of oxygen in the oxidant stream will become progressively diminished as the oxygen is consumed by the electrochemical reaction at the cathode. In these circumstances, the lowest concentration of oxygen will be found at the outlet of the oxidant stream from the cathode layer. For both dilute and pure oxidant streams, the lowest water content will normally be found at the inlet of the oxidant stream to the cathode. As water is generated by the electrochemical reaction at the cathode, the water content will typically increase as the oxidant stream is directed to the outlet, where the oxidant stream will have the highest water content. Preferably, the temperature of the oxidant stream should be increased (i.e., a positive temperature gradient should be established) between the oxidant stream inlet and oxidant stream outlet of the cathode layer, since the capacity of a gas stream to carry water vapor increases as its temperature increases.

In conventional fuel cell stacks, the approach to thermal management is to provide isothermal conditions across the entire active area of the cell. For example, in U.S. Pat. No. 5,230,966, a coolant fluid flow field plate is disclosed which has a rib-cage flow channel configuration in an attempt to more uniformly cool, and thereby provide isothermal conditions, across the central, active area of the cell.

In operation, the attempt to create isothermal conditions across the cell active area often leads a gradual change in other conditions, particularly with respect to water in the MEA, across the cell active area. In order to describe the change in conditions it is useful to loosely define different regions or zones of the cell and their typical conditions as follows:

Initial Zone (the region near the oxidant stream inlet)—the incoming oxidant stream is generally not saturated with water at the operating temperature of the fuel cell and is capable of absorbing product water, formed at the cathode, without saturating the oxidant stream. Under these conditions, however, water will also evaporate from the membrane electrolyte. This dehydration of the electrolyte increases electrolyte resistance, decreases performance and may decrease electrolyte lifetime.

Intermediate Zone—as the oxidant stream moves across the active area towards the cathode outlet, the water content in the oxidant stream will rise towards saturation and the point where, at the fuel cell operating temperature, the oxidant stream will remove the product water without dehydrating the membrane.

Final Zone (the region near the oxidant stream outlet)—as the oxidant stream approaches the outlet, the product water generated by the fuel cell can exceed the water carrying capacity of the oxidant stream at the fixed operating temperature of the fuel cell. No additional product water can therefore be absorbed into the oxidant stream. As a consequence, liquid water may accumulate, resulting in diminished localized fuel cell performance due to impeding access of the oxidant to the active electrocatalytic sites at the membrane/electrode interface, and/or the formation of blockages which inhibit the flow of the oxidant stream through some channels in a multiple channel flow field (i.e., flooding).

In the electrochemical fuel cell stack of U.S. Pat. No. 5,547,776, the temperature in each of the Initial, Intermediate and Final Zones is deliberately adjusted in order to achieve satisfactory performance across the cell active area. The temperature, and thus water carrying capacity, of the oxidant stream is controlled (increased in the flow direction) so that product water can be removed without membrane dehydration.

This biased cooling is achieved by adjusting the flow path of the coolant stream across each cell and by adjusting the mass flow rate of the coolant stream. In particular, a concurrent or coflow approach is employed, so that the incoming coolant stream, which enters the coolant flow field channels at its coolest temperature, is flowed adjacent the Initial Zone. As the coolant stream reaches the Intermediate Zone, it has been warmed from the absorption of heat from the electrochemical reactions in the fuel cell, and the coolant stream will continue to absorb heat and increase in temperature as it flows toward the coolant stream outlet.

As the heated coolant stream flows adjacent the Final Zone, where the coolant stream at its hottest temperature, more water is permitted to enter the vapor state and be carried out of the cell without flooding and/or mass transport problems. The magnitude of the temperature increase between the coolant stream inlet and the coolant stream outlet is adjusted by varying the coolant stream flow rate and can be set to produce the optimal aggregate performance of all zones operating in concert.

The term "adjacent" as used herein means that a structure is in close proximity to another structure; the structures may or may not be in contact, but there are none of the same structures in between the adjacent structures.

The coolant stream in the fuel cell stack of the '776 patent is directed such that the coolest region of each cooling layer substantially coincides with the region of the adjacent cathode layer in which the oxidant stream has the lowest water content. At the same time, the coolant stream is directed such that the warmest region of each cooling layer substantially coincides with the region of the adjacent cathode layer in which the oxidant stream has the highest water content.

In the fuel cell stack of the '776 patent, the region of the cathode layer in which the oxidant stream has the lowest water content generally corresponds to the region in which the oxidant stream has the highest concentration of oxygen, typically nearest the inlet of the oxidant stream to the cathode layer. Conversely, the region of the cathode layer in which the oxidant stream has the highest water content generally corresponds to the region in which the oxidant stream has the lowest concentration of oxygen, typically nearest the outlet of the oxidant stream from the cathode layer.

It has been found that, in fuel cell assemblies with concurrent flow of coolant and oxidant streams, the simultaneous countercurrent flow of the fuel and oxidant streams is particularly advantageous. In such a countercurrent flow approach, the fuel stream in each fuel cell is directed to a region of the anode layer which substantially coincides with the region of the adjacent cathode layer (on the opposite side of the membrane) in which the oxidant stream has the lowest oxygen concentration and typically the highest water content. The fuel stream is subsequently directed to a region of the anode layer which substantially coincides with the region of the adjacent cathode layer in which the oxidant stream has the highest oxygen concentration and typically the lowest water content.

With dilute reactant streams countercurrent flow of fuel and oxidant can result in a more uniform current density distribution across the fuel cell active area than that achieved in fuel cells with cross-flow or concurrent flow of fuel and oxidant streams. The overall water content (present as vapor and entrained liquid) of both the fuel and oxidant streams typically increases in the flow direction through the fuel cell, so that with a countercurrent flow arrangement the region of the anode layer with the highest water content will substantially coincide with the region of the cathode with the lowest water content and vice versa. A countercurrent flow orientation of fuel and oxidant may thus counteract the disadvantageous effects of drying of the membrane near the oxidant stream inlet and flooding near the oxidant stream outlet, since with a water permeable membrane and water concentration gradient across the membrane, water will tend to pass through the membrane.

The use of countercurrent flow of fuel and oxidant streams in combination with concurrent flow of coolant and oxidant streams offers particular advantages (for operation on pure or dilute reactant streams) by enhancing this effect. Decreasing temperature in the fuel flow direction (by countercurrent flow of the coolant and fuel streams) will tend to decrease the water vapor carrying capacity of the fuel stream in the flow direction and may cause liquid water to condense from the stream in the cooler regions of the anode layer. This water may pass through the membrane and serve to humidify the oxidant stream in the vicinity of the inlet in the cathode layer. This can reduce or eliminate the need for humidification of the oxidant stream prior to its introduction into the fuel cell. In addition, in fuel cell stacks with this type of flow arrangement, the region of the cathode layer in which the oxidant stream has the highest water content and where flooding tends to occur, will substantially coincide with the region of the anode layer where the fuel stream has the highest water vapor carrying capacity, so that water may be drawn through the membrane from the cathode layer to the anode layer, thereby alleviating flooding near the oxidant stream outlet.

In this mode of operation, the coolest region of the cooling layer substantially coincides with the region of the cathode layer in which the oxidant stream has the lowest water content (near the inlet), the warmest region of the cooling layer substantially coincides with the region of the cathode layer in which the oxidant stream has the highest water content, and the fuel stream is directed from a region of the anode layer substantially coinciding with the warmest region of the cooling layer to a region of the anode layer substantially coinciding with the coolest region of the cooling layer.

SUMMARY OF THE INVENTION

One embodiment of an electrochemical fuel cell stack with concurrent flow of coolant and oxidant streams and countercurrent flow of fuel and oxidant streams comprises at least one fuel cell assembly. The assembly comprises:

A. at least one fuel cell comprising:
  1. an anode layer comprising at least one fuel stream inlet, at least one fuel stream outlet, and means for flowing a fuel stream from the at least one fuel stream inlet to the at least one fuel stream outlet;
  2. a cathode layer comprising at least one oxidant stream inlet, at least one oxidant stream outlet, and means for flowing an oxidant stream from the at least one oxidant stream inlet to the at least one oxidant stream outlet, the oxidant stream comprising oxygen and water formed by the electrochemical reaction of the fuel and the oxygen;
  3. an electrolyte interposed between the anode layer and the cathode layer; and B. a cooling layer disposed adjacent the cathode layer, the cooling layer comprising at least one coolant stream inlet, at least one coolant stream outlet, and means for flowing a coolant stream from the at least one coolant stream inlet to the at least one coolant stream outlet.

The coolant stream flowing means directs the coolant stream such that the coolest region of the cooling layer substantially coincides with the region of the cathode layer in which the oxidant stream has the lowest water content, and the warmest region of the cooling layer substantially coincides with the region of the cathode layer in which the oxidant stream has the highest water content; and the fuel stream flowing means directs the fuel stream to a region of the anode layer which substantially coincides with the region of the cathode layer in which the oxidant stream has the highest water content and subsequently directs the fuel stream to a region of the anode layer which substantially coincides with the region of the cathode layer in which the oxidant stream has the lowest water content.

The fuel stream inlet, oxidant stream inlet and coolant stream inlet are fluidly connectable to a source of fuel, oxidant and coolant respectively.

In the preferred electrochemical fuel cell stack, the electrolyte is an ion exchange membrane and the fuel stream comprises hydrogen.

In one embodiment of an electrochemical fuel cell stack, one of the at least one fuel stream outlet and the at least one oxidant stream outlet is centrally disposed in the anode layer or the cathode layer, respectively, and the other of the at least one fuel stream outlet and the at least one oxidant stream outlet is peripherally disposed in the anode layer or the cathode layer, respectively. An example of this embodiment would be a circular fuel cell with radial countercurrent flow of fuel and oxidant.

In a preferred electrochemical fuel cell stack, the fuel stream flowing means comprises at least one channel formed in the anode layer for directing the fuel stream from the at least one fuel stream inlet to the at least one fuel stream outlet, and the oxidant stream flowing means comprises at least one channel formed in the cathode layer for directing the oxidant stream from the at least one oxidant stream inlet to the at least one oxidant stream outlet. The at least one fuel stream channel preferably comprises a plurality of fuel stream channels extending between the at least one fuel stream inlet and the at least one fuel stream outlet and the at least one oxidant stream channel preferably comprises a plurality of oxidant stream channels extending between the at least one oxidant stream inlet and the at least one oxidant stream outlet. The at least one fuel stream channel preferably traverses the anode layer in a plurality of serpentine passes and the at least one oxidant stream channel preferably traverses the cathode layer in a plurality of serpentine passes. Other reactant stream channel geometries, such as, for example, spiral or parallel linear channels, may be selected depending on the fuel cell assembly and stack configuration.

In one preferred embodiment, the at least one fuel stream channel and the at least one oxidant stream channel preferably extend such that the at least one fuel stream channel and the at least one oxidant stream channel substantially coincide, whereby the fuel stream and the oxidant stream flow countercurrently along a substantial portion of their respective lengths. In another preferred embodiment, the at least one fuel stream channel and the at least one oxidant stream channel extend such that the at least one fuel stream channel is disposed between sequential passes of the oxidant stream channel along a substantial portion of the length of the fuel stream channel.

In one embodiment of a preferred electrochemical fuel cell stack, the anode layer comprises:

a. an electrically conductive, substantially fluid impermeable anode fluid flow field plate having formed therein, on the surface thereof facing the electrolyte, the at least one fuel stream channel; and b. a first sheet of porous electrically conductive material interposed between the anode fluid flow field plate and the electrolyte, and a quantity of electrocatalyst disposed between the electrolyte and the first sheet;

and the cathode layer comprises:

c. an electrically conductive, substantially fluid impermeable cathode fluid flow field plate having formed therein, on the surface thereof facing the electrolyte, the at least one oxidant stream channel; and d. a second sheet of porous electrically conductive material interposed between the cathode fluid flow field plate and the electrolyte, and a quantity of electrocatalyst disposed between the electrolyte and the second sheet.

In another embodiment of a preferred electrochemical fuel cell stack, the anode layer comprises:

a. an electrically conductive, substantially fluid impermeable anode separator plate; and b. a first sheet of porous electrically conductive material interposed between the anode separator plate and the electrolyte, and a quantity of electrocatalyst disposed between the electrolyte and the first sheet, the first sheet having formed therein, on the surface thereof facing the anode separator plate, the at least one fuel stream channel;

and the cathode layer comprises:

c. an electrically conductive, substantially fluid impermeable cathode separator plate; and d. a second sheet of porous electrically conductive material interposed between the cathode separator plate and the electrolyte, and a quantity of electrocatalyst disposed between the electrolyte and the second sheet, the second sheet having formed therein, on the surface thereof facing the cathode separator plate, the at least one oxidant stream channel.

In a preferred electrochemical fuel cell stack, the anode layer comprises a first sheet of porous material and the fuel stream flowing means comprises the interstices of the first porous material sheet, and the cathode layer comprises a second sheet of porous material and the oxidant stream flowing means comprises the interstices of the second porous material sheet. The porous sheet material is electrically conductive material, such as carbon fiber paper.

Another embodiment of an electrochemical fuel cell stack with concurrent flow of coolant and oxidant streams and countercurrent flow of fuel and oxidant streams comprises at least one fuel cell assembly. The assembly comprises:

A. at least one fuel cell comprising:

1. an anode layer comprising at least one fuel stream inlet, at least one fuel stream outlet, and means for flowing a fuel stream from the at least one fuel stream inlet to the at least one fuel stream outlet;

2. a cathode layer comprising at least one oxidant stream inlet, at least one oxidant stream outlet, and means for flowing a oxidant stream from the at least one oxidant stream inlet to the at least one oxidant stream outlet, the oxidant stream comprising oxygen;

3. an electrolyte interposed between the anode layer and the cathode layer; and

B. a cooling layer disposed adjacent the cathode layer, the cooling layer comprising at least one coolant stream inlet, at least one coolant stream outlet, and means for flowing a coolant stream from the at least one coolant stream inlet to the at least one coolant stream outlet.

The coolant stream flowing means directs the coolant stream such that the coolest region of the cooling layer substantially coincides with the region of the cathode layer in which the oxidant stream has the highest concentration of oxygen, and the warmest region of the cooling layer substantially coincides with the region of the cathode layer in which the oxidant stream has the lowest concentration of oxygen; and the fuel stream flowing means directs the fuel stream to a region of the anode layer which substantially coincides with the region of the cathode layer in which the oxidant stream has the lowest concentration of oxygen and subsequently directs the fuel stream to a region of the anode layer which substantially coincides with the region of the cathode layer in which the oxidant stream has the highest concentration of oxygen.

In one embodiment of a method of controlling the water content of an oxidant stream in a cathode layer of an electrochemical fuel cell assembly, the assembly comprising a cooling layer adjacent the cathode layer, the cooling layer comprising a coolant stream inlet, a coolant stream outlet, and means for flowing a coolant stream from the at least one coolant stream inlet to the at least one coolant stream outlet, the assembly further comprising an anode layer comprising a fuel stream inlet, a fuel stream outlet, and means for flowing a fuel stream from the at least one fuel stream inlet to the at least one fuel stream outlet, the method comprises:

a. flowing the coolant stream such that the coolest region of the cooling layer substantially coincides with the region of the cathode layer in which the oxidant stream has the lowest water content and the warmest region of the cooling layer substantially coincides with the region of the cathode layer in which the oxidant stream has the highest water content; and b. flowing the fuel stream such that the fuel stream is directed to a region of the anode layer which substantially coincides with the region of the cathode layer in which the oxidant stream has the highest water content and is subsequently directed to a region of the anode layer which substantially coincides with the region of the cathode layer in which the oxidant stream has the lowest water content.

In another embodiment of a method for controlling the water content of the oxidant stream in a cathode layer of an electrochemical fuel cell assembly, the oxidant stream comprising oxygen, the assembly comprising a cooling layer adjacent the cathode layer, the cooling layer comprising a coolant stream inlet, a coolant stream outlet, and means for flowing a coolant stream from the at least one coolant stream inlet to the at least one coolant stream outlet, the assembly further comprising an anode layer comprising a fuel stream inlet, a fuel stream outlet, and means for flowing a fuel stream from the at least one fuel stream inlet to the at least one fuel stream outlet, the method comprises:

a. flowing the coolant stream such that the coolest region of the cooling layer substantially coincides with the region of the cathode layer in which the oxidant stream has the highest concentration of oxygen and the warmest region of the cooling layer substantially coincides with the region of the cathode layer in which the oxidant stream has the lowest concentration of oxygen; and b. flowing the fuel stream such that the fuel stream is directed to a region of the anode layer which substantially coincides with the region of the cathode layer in which the oxidant stream has the lowest concentration of oxygen and is subsequently directed to a region of the anode layer which substantially coincides with the region of the cathode layer in which the oxidant stream has the highest concentration of oxygen.

BRIEF DESCRIPTION OF THE DRAWINGS

FIG. 1 is a perspective view of a typical embodiment of an electrochemical fuel cell stack.

FIG. 2 is an front end elevation view of the electrochemical fuel cell stack illustrated in FIG. 1.

DETAILED DESCRIPTION OF THE PREFERRED EMBODIMENT

Figure 3:
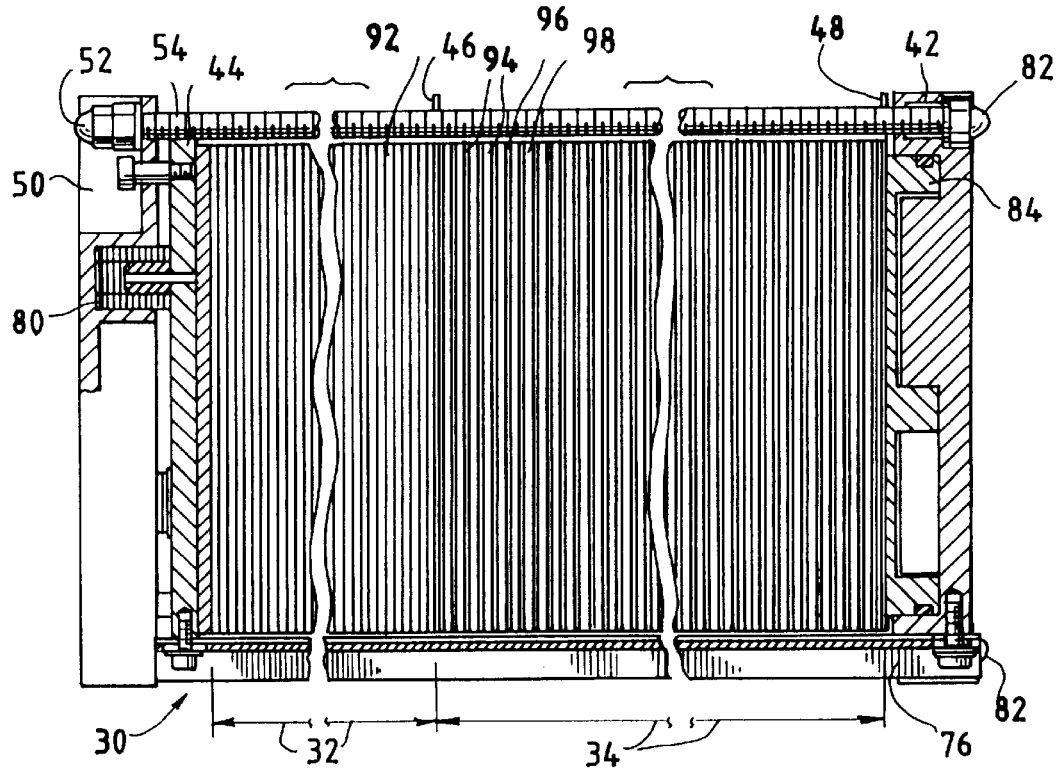
FIG. 3 is a sectional view of the electrochemical fuel cell stack taken in the direction of arrows 3—3 in FIG. 2.

Turning first to FIG. 1, an electrochemical fuel cell stack 30 has a humidification section 32 located upstream from the electrochemically active section 34. Stack 30 is a modular plate and frame design, and includes a compression end plate 42 and a fluid end plate 44. Compression end plate 42 has a pneumatic bladder (not shown) mounted on its surface facing active section 34, which compresses the plates which make up fuel cell stack 30, thereby promoting sealing and electrical contact between the plates of the stack. Bus plates 46 and 48, which are located on opposite ends of active section 34, provide the negative and positive contacts, respectively, to draw current generated by the assembly to a load (not shown in FIG. 1). Tie rods 54 extend between fluid end plate 44 and compression bars 50 to retain and secure stack 30 in its assembled state with fastening nuts 52.

As shown in FIG. 1, fluid end plate 44 has extending therefrom six inlet and outlet ports for connecting the incoming and outgoing reactant and coolant streams to the stack. The ports are inlet fuel stream port 62, outlet fuel stream port 64, inlet oxidant stream port 66, outlet oxidant stream port 68, inlet coolant stream port 70, and outlet coolant stream port 72.

FIG. 2 is a front end elevation view of the electrochemical fuel cell stack illustrated in FIG. 1. FIG. 2 shows fluid end plate 44 and compression bars 50 retaining and securing stack 30 in its assembled state with fastening nuts 52. Inlet fuel stream port 62, outlet fuel stream port 64, inlet oxidant stream port 66, outlet oxidant stream port 68, inlet coolant stream port 70, and outlet coolant stream port 72 extend from fluid end plate 44. Ports 74 and support channel member 76 are described in more detail below in connection with FIGS. 5 and 6.

FIG. 3 is a sectional view of the stack 30 taken in the direction of arrows 3—3 in FIG. 2. As shown in FIG. 3, active section 34 includes, in addition to bus plates 46 and 48, a plurality of recurring fuel cell units. Each cell consists of a membrane electrode assembly 96 interposed between two reactant flow field plates 94. A coolant flow field plate 98 is inserted at regular intervals to provide a cooling layer (sometimes also referred to as a cooling cell or jacket) for removing heat generated by the electrochemical reaction occurring in the cells of the active section 34. The cells of the active section 34 are electrically coupled in series by virtue of the contact between the electrically conductive sheets that form the layers of the cells.

As shown in FIG. 3, humidification section 32 includes a plurality of humidification cells, one of which is designated in FIG. 3 as humidification cell 92. Each humidification cell 92 consists of a reactant fluid flow field plate (not shown in FIG. 3), a water flow field plate (not shown), and a water vapor transport membrane (not shown) interposed between the reactant fluid flow field plate and the water flow field plate. In humidification section 32, water vapor is imparted to the fuel and oxidant streams prior to introducing the reactant streams to active section 34.

Further components of the compression bars 50 and the compression end plate 42 are also shown in FIG. 3. Each compression bar 50 has a plurality of disc-spring washers 80 stacked in a cavity formed in its underside to urge the compression bar 50 away from the remainder of stack 30, thereby compressing the layers to promote sealing of the stack. Compression end plate 42 has a pneumatic piston 84 positioned within it to apply uniform pressure to the assembly, thereby promoting sealing. Support channel member 76, the ends of which are also shown in FIGS. 2 and 4, extends the length of humidification section 32 and active section 34 in order to preserve the alignment and prevent the sagging of the plates which make up stack 30.

Figure 4:
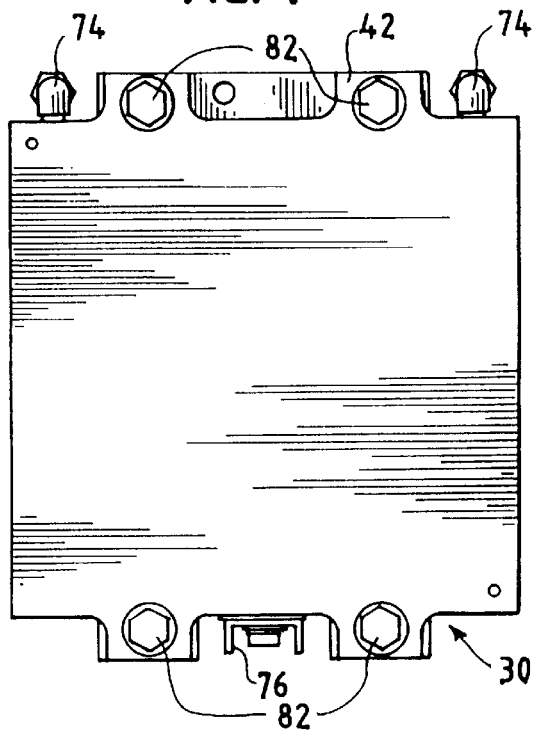
FIG. 4 is a rear end elevation view of the electrochemical fuel cell stack illustrated in FIGS. 1–3, showing the end opposite that illustrated in FIG. 2.

FIG. 4 is a rear end elevation view of stack 30 illustrated in FIG. 1, showing the end opposite that illustrated in FIG. 2. Compression end plate 42 is retained and secured to the remainder of stack 30 by bolt heads 82 located at the end of tie rods 54 opposite fastening nuts 52 (not shown in FIG. 4). Ports 74, also shown in FIG. 2, allow the introduction of pressurized fluid to the bladder between pneumatic piston 84 and compression end plate 42 (see FIG. 3), thereby promoting sealing and electrical contact between the plates which make up stack 30.

Figure 5:
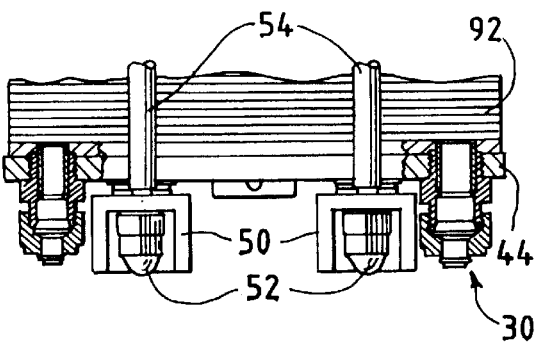
FIG. 5 is a partial top view, partially in section of the electrochemical fuel cell stack illustrated in FIGS. 2—4.

FIG. 5 is a partial top view, partially in section, of stack 30 illustrated in FIGS. 3–5. A portion of the humidification section, which includes humidification cell 92, is illustrated in FIG. 5. FIG. 5 also shows compression bars 50 secured to stack 30 by nuts 52 at the end of tie rods 54.

Figure 6A:
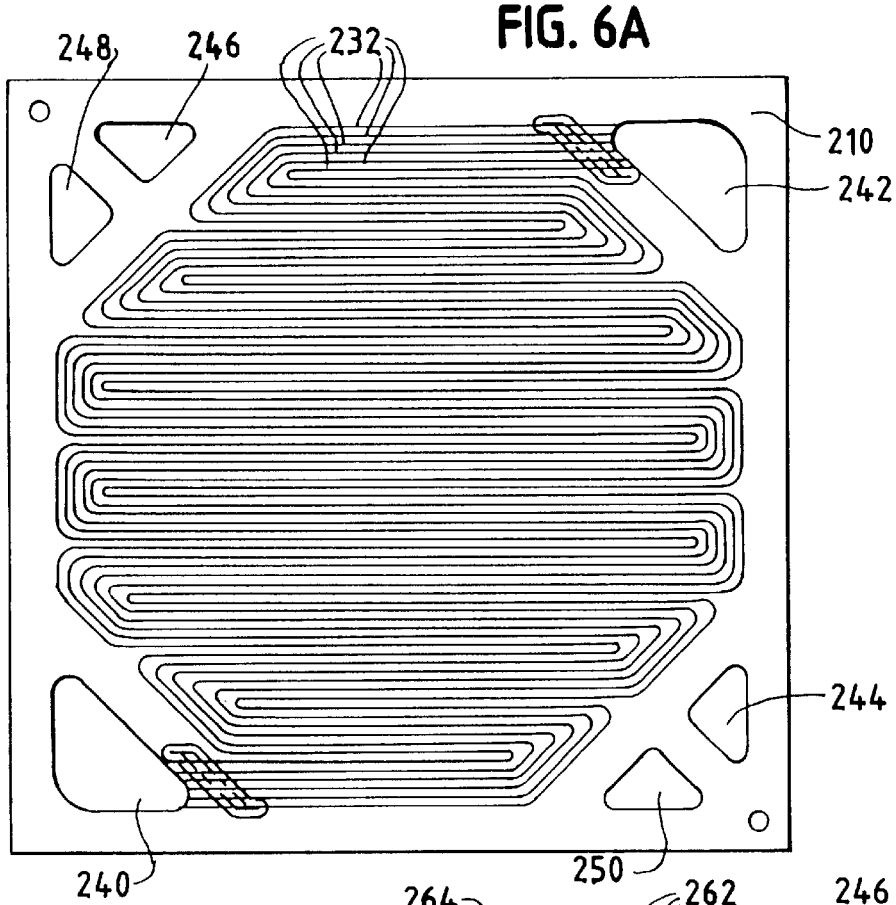
FIG. 6A is an end elevation view of one side of an oxidant/coolant fluid flow field plate from the active section of the fuel cell stack illustrated in FIGS. 1–5, showing the configuration of the channels which form the oxidant stream flow field, as well as the six manifold openings for the fuel, oxidant and coolant streams.

FIG. 6A shows one side of an oxidant/coolant fluid flow field plate 210 from the active section of the fuel cell stack illustrated in FIGS. 1–5. The manifold openings in plate 210 are humidified fuel manifold opening 244, outlet fuel manifold opening 246, humidified oxidant manifold opening 240, outlet oxidant manifold opening 242, inlet coolant manifold opening 248, and coolant/humidification fluid manifold opening 250. The surface of plate 210 illustrated in FIG. 6A has formed therein a plurality of oxidant fluid flow channels 232 which traverse a serpentine path across the central, electrochemically active area of plate 210.

Figure 6B:
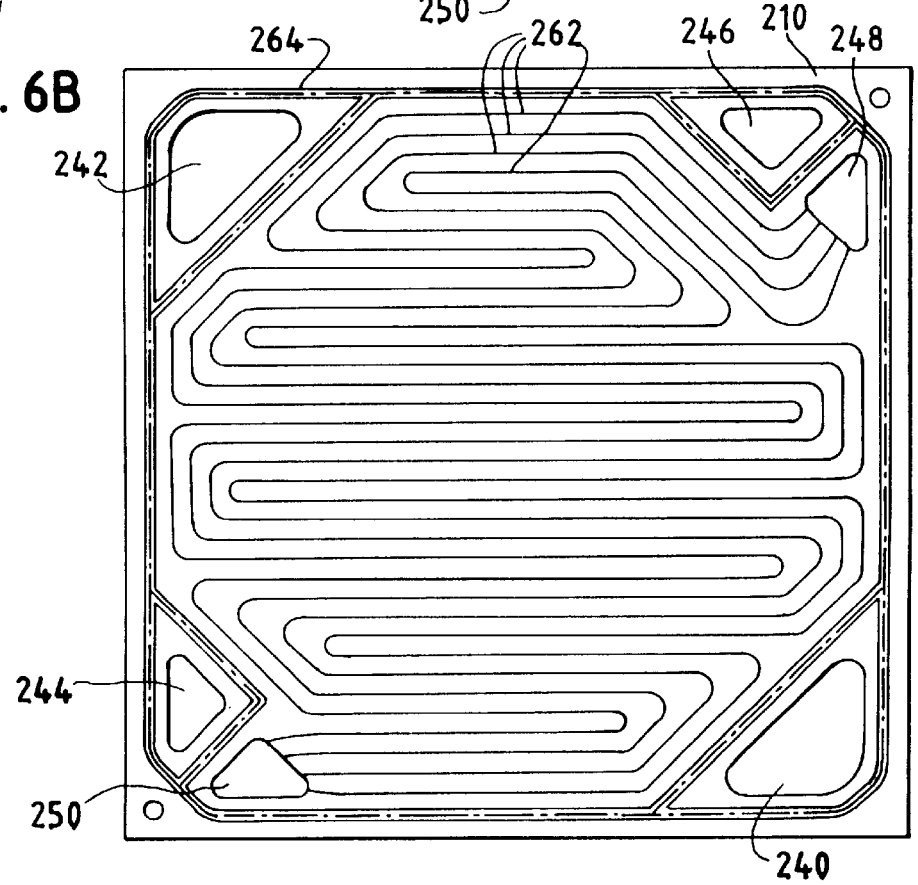
FIG. 6B is an end elevation view of the opposite side of the oxidant/coolant fluid flow field plate shown in FIG. 6A, showing the configuration of the channels which form the coolant stream flow field.

FIG. 6B is an end elevation view of the opposite side of the oxidant/coolant fluid flow field plate 210 shown in FIG. 6A. In addition to the six manifold openings illustrated and described above for FIG. 6A, the opposite surface of plate 210 shown in FIG. 6B has formed therein a plurality of coolant fluid flow channels 262 which traverse a serpentine path across the central, electrochemically active area of plate 210. As shown in FIGS. 6A and 6B, except for a short length of the coolant fluid flow channels in the vicinity of opening 248, the serpentine configuration of the coolant fluid flow channels correspond substantially to the serpentine configuration of the oxidant fluid flow field channels on the opposite major surface of plate 210. Thus, the coolant stream is directed through flow channels 262 such that the coolest portion of the coolant stream substantially coincides with the portion of the oxidant stream having the highest concentration of oxygen (and also the lowest water content), and the warmest portion of the coolant stream substantially coincides with the portion of the oxidant stream having the lowest concentration of oxygen (and also the highest water content).

As shown in FIG. 6B, a sealant material or gasket 264 circumscribes each of the reactant manifold openings to isolate the central, coolant flow field portion of plate 210 from the reactant streams flowing through the manifolds. The sealant material or gasket 264 also inhibits the coolant stream from escaping to the environment surrounding the stack when the stack is in its assembled state.

Figure 7:
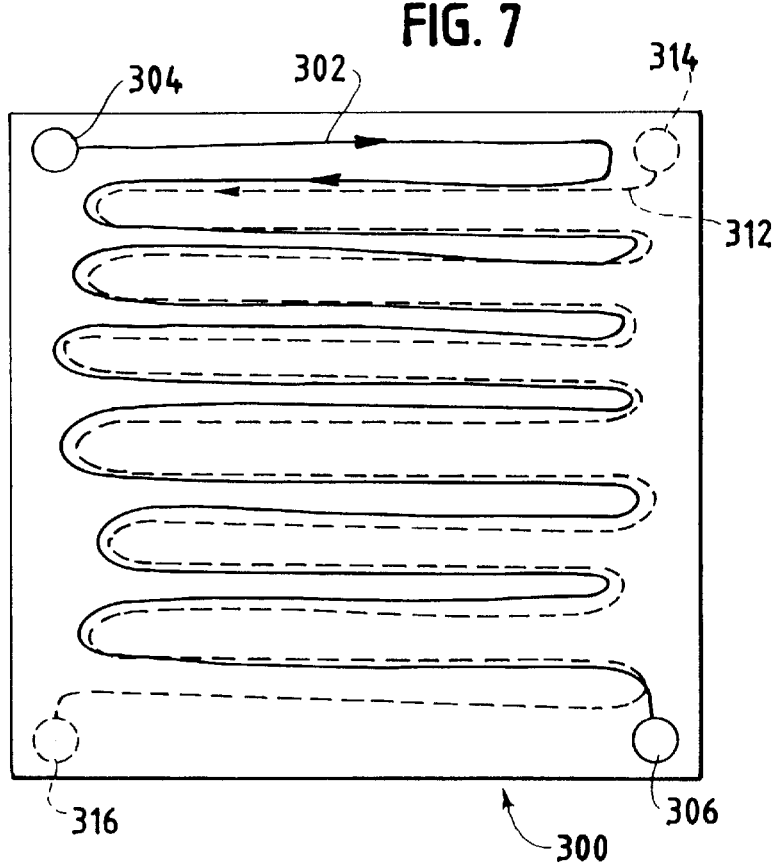
FIG. 7 is an end view of a coolant flow field plate having a serpentine channel extending between a coolant stream inlet and a diagonally opposed coolant stream outlet, and, in phantom lines, an adjacent oxidant flow field plate having a serpentine channel extending between an oxidant stream inlet and a diagonally opposed oxidant stream outlet, in which the coolant stream channel and the oxidant stream channel substantially coincide.

FIG. 7 shows an end view of a coolant flow field plate 300 having a serpentine channel 302 extending between a coolant stream inlet 304 and a diagonally opposed coolant stream outlet 306. In phantom lines, an adjacent oxidant flow field plate has a serpentine channel 312 extending between an oxidant stream inlet 314 and a diagonally opposed oxidant stream outlet 316. The coolant stream channel 302 and the oxidant stream channel 312 extend such that the coolest region of the coolant flow field plate 300, which corresponds to the portion of coolant stream channel 302 nearest coolant stream inlet 304, substantially coincides with the region of the adjacent oxidant flow field plate having the highest concentration of oxygen (and also the lowest water content), which corresponds to the portion of oxidant stream channel 312 nearest oxidant stream inlet 314. Similarly, the warmest region of coolant flow field plate 300, which corresponds to the portion of coolant stream channel 302 nearest coolant stream outlet 306, substantially coincides with the region of the adjacent oxidant flow field plate having the lowest concentration of oxygen (and also the highest water content), which corresponds to the portion of oxidant stream channel 312 nearest oxidant stream outlet 316.

Figure 8:
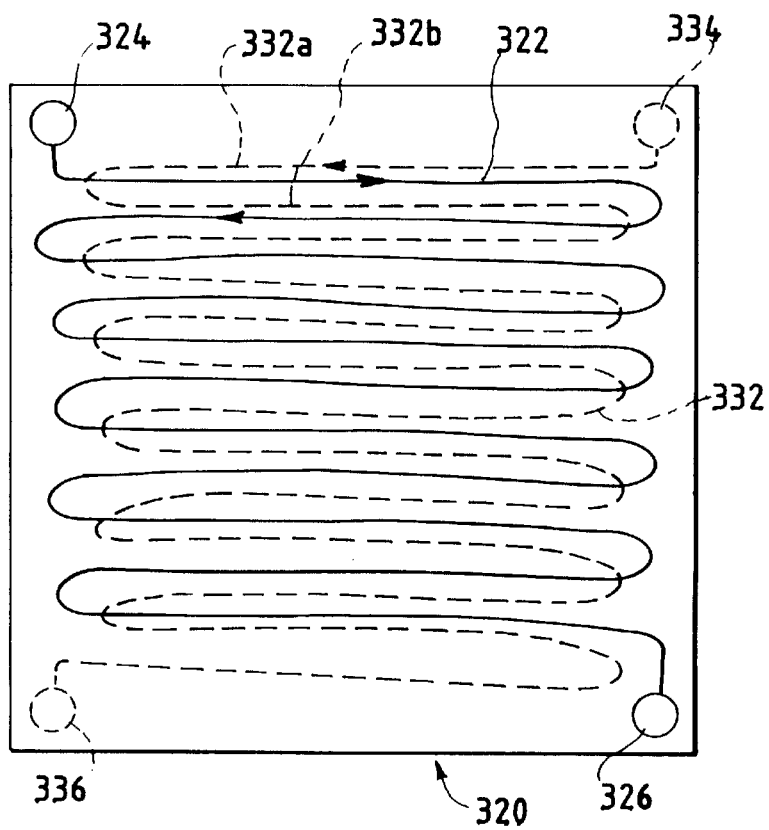
FIG. 8 is an end view of a coolant flow field plate having a serpentine channel extending between a coolant stream inlet and a diagonally opposed coolant stream outlet, and, in phantom lines, an adjacent oxidant flow field plate having a serpentine channel extending between an oxidant stream inlet and a diagonally opposed oxidant stream outlet, in which the coolant stream channel is disposed between sequential passes of the oxidant stream channel.

FIG. 8 shows an end view of a coolant flow field plate 320 having a serpentine channel 322 extending between a coolant stream inlet 324 and a diagonally opposed coolant stream outlet 326. In phantom lines, an adjacent oxidant flow field plate has a serpentine channel 332 extending between an oxidant stream inlet 334 and a diagonally opposed oxidant stream outlet 336. The coolant stream channel 322 is disposed between sequential passes 332a and 332b of the oxidant stream channel 332 in the adjacent cathode layer. As in FIG. 7, the coolest region of the coolant flow field plate 320, which corresponds to the portion of coolant stream channel 322 nearest coolant stream inlet 324, substantially coincides with the region of the adjacent oxidant flow field plate having the highest concentration of oxygen (and also the lowest water content), which corresponds to the portion of oxidant stream channel 332 nearest oxidant stream inlet 334. Similarly, the warmest region of coolant flow field plate 320, which corresponds to the portion of coolant stream channel 322 nearest coolant stream outlet 326, substantially coincides with the region of the adjacent oxidant flow field plate having the lowest concentration of oxygen (and also the highest water content), which corresponds to the portion of oxidant stream channel 332 nearest oxidant stream outlet 336.

Figure 9:
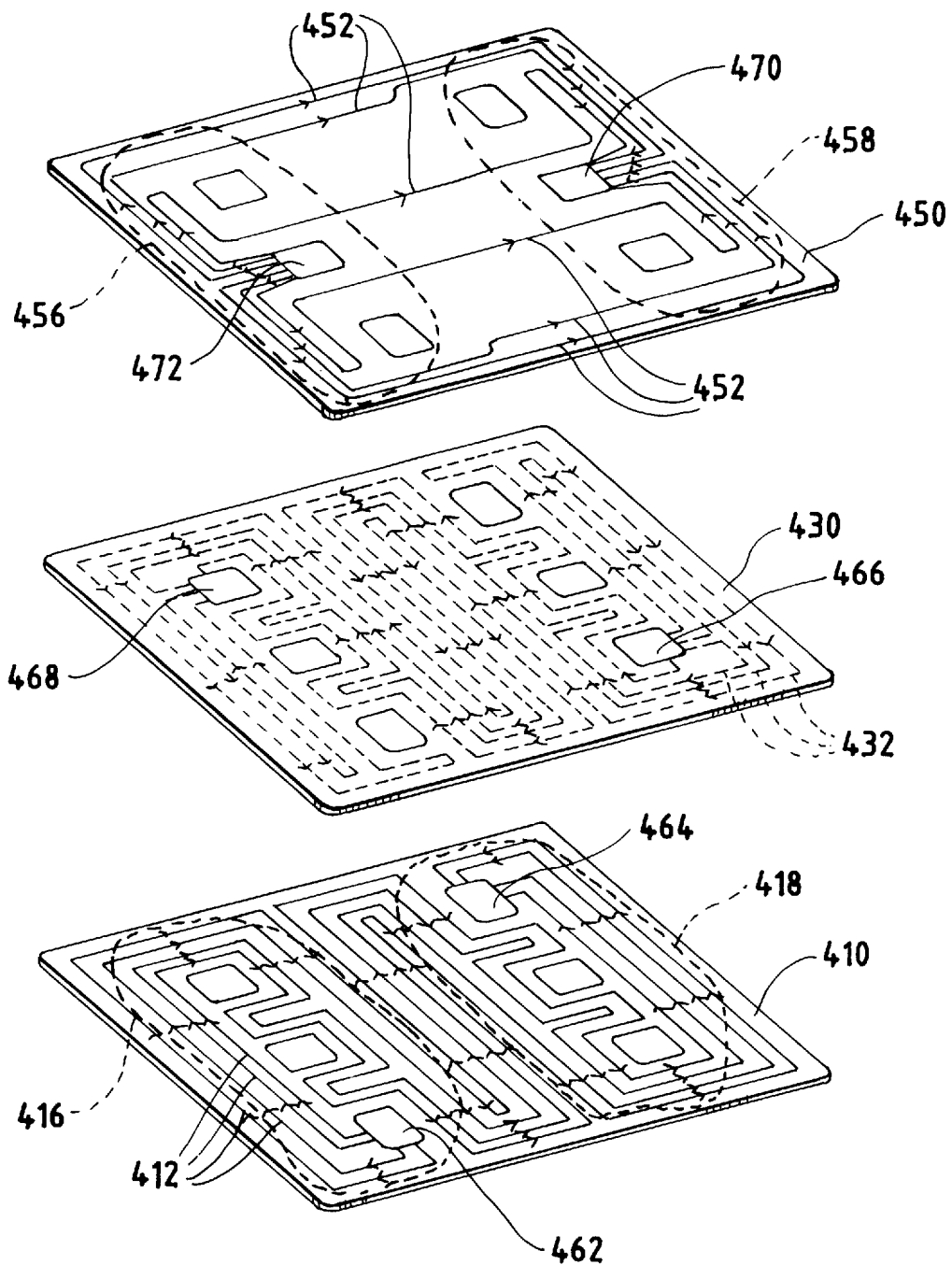
FIG. 9 is an exploded perspective view of a portion of a fuel cell stack showing the relative flow paths of the fuel, oxidant and coolant streams in a first embodiment of a fuel cell assembly with concurrent flow of coolant and oxidant streams and countercurrent flow of fuel and oxidant streams.

FIG. 9 shows an exploded perspective view of a portion of a first embodiment of a fuel cell assembly which includes an oxidant flow field plate 410, a fuel flow field plate 430, and a coolant flow field plate 450. In actuality, the illustrated coolant and oxidant flow fields are formed on opposite sides of the same plate, but are shown as being formed on separate plates in FIG. 9 for ease of illustration. Also, for clarity, fewer channels are shown on each flow field plate than are typically present in actuality.

As shown in FIG. 9, oxidant flow field plate 410 has formed therein serpentine channels 412 extending between an oxidant stream inlet 462 and a diagonally opposed oxidant stream outlet 464. In operation, the region within the broken lines designated by the numeral 416 is the region of oxidant flow field plate 410 having the highest concentration of oxygen (and also the lowest water content). The region within the broken lines designated by the numeral 418 is, in operation, the region of oxidant flow field plate 410 having the lowest concentration of oxygen (and also the highest water content).

As further shown in FIG. 9, fuel flow field plate 430 has formed therein serpentine channels 432 extending between a fuel stream inlet 466 and a diagonally opposed fuel stream outlet 468. In operation, channels 432 direct the fuel stream to a region of the fuel flow field plate 430 which substantially coincides with region 418 of oxidant flow field plate 410, in which the oxidant stream has the lowest concentration of oxygen (and also the highest water content). Channels 432 subsequently direct the fuel stream to a region of the fuel flow field plate 430 which substantially coincides with the region 416 of oxidant flow field plate 410, in which the oxidant stream has the highest concentration of oxygen (and also the lowest water content).

As further shown in FIG. 9, coolant flow field plate 450 has formed therein serpentine channels 452 extending between a coolant stream inlet 472 and a coolant stream outlet 470. In operation, the region within the broken lines designated by the numeral 456 is the coolest region of coolant flow field plate 450, and the region within the broken lines designated by the numeral 458 is the warmest region of coolant flow field plate 450. In operation, channels 452 direct the coolant stream such that the coolest region 456 of coolant flow field plate 450 substantially coincides with the region 416 of oxidant flow field plate 410 in which the oxidant stream has the highest concentration of oxygen (and also the lowest water content). Channels 452 also direct the coolant stream such that the warmest region 458 of coolant flow field plate 450 substantially coincides with the region 418 oxidant flow field plate 410 in which the oxidant stream has the lowest concentration of oxygen (and also the highest water content).

Figure 10:
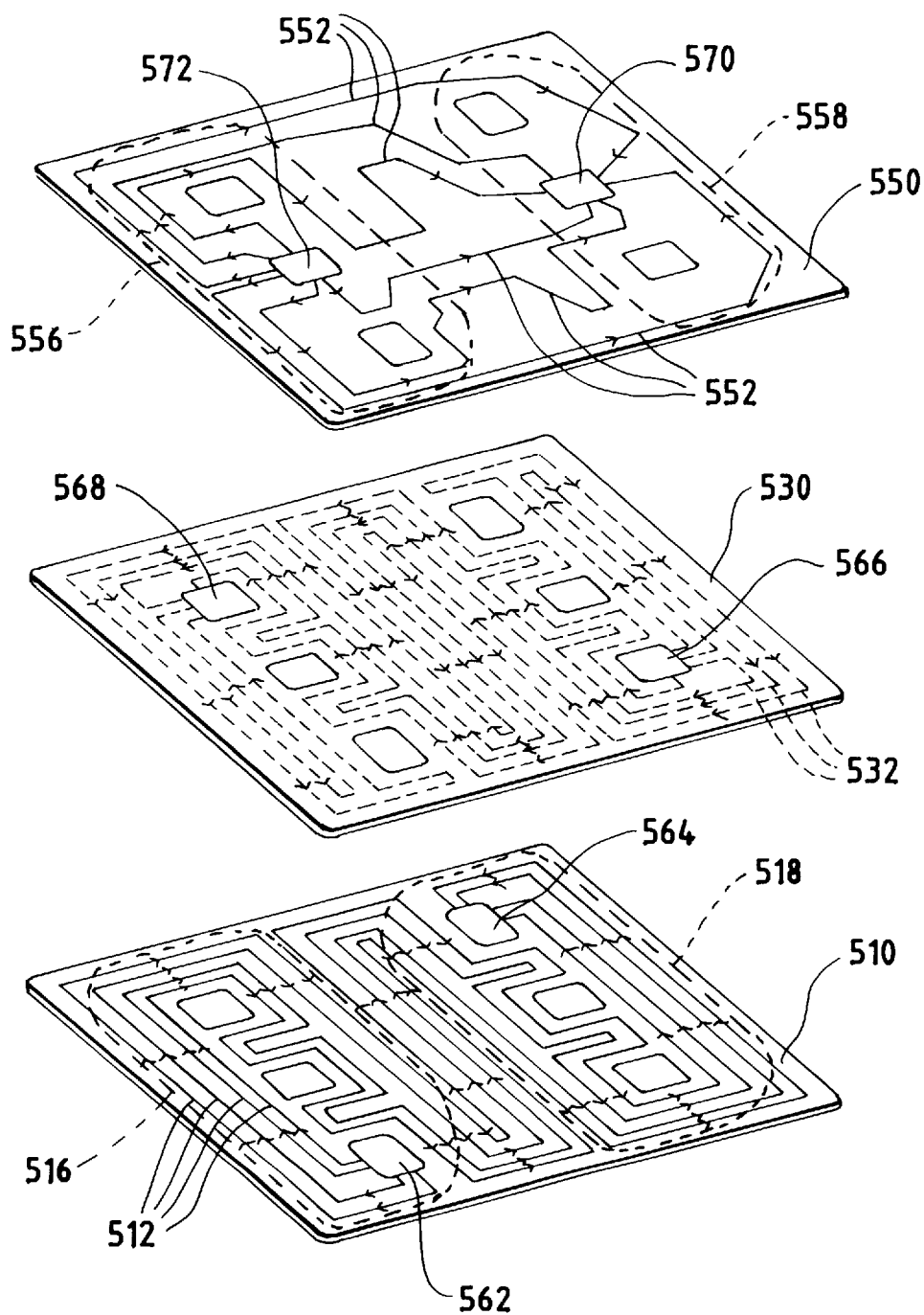
FIG. 10 is an exploded perspective view of a portion of a fuel cell stack showing the relative flow paths of the fuel, oxidant and coolant streams in a second embodiment of a fuel cell assembly with concurrent flow of coolant and oxidant streams and countercurrent flow of fuel and oxidant streams.

FIG. 10 shows an exploded perspective view of a portion of a second embodiment of a fuel cell assembly which includes an oxidant flow field plate 510, a fuel flow field plate 530, and a coolant flow field plate 550. In actuality, the illustrated coolant and oxidant flow fields are formed on opposite sides of the same plate, are shown as being formed on separate plates in FIG. 10 for ease of illustration. Also, for clarity, fewer channels are shown on each flow field plate than are typically present in actuality.

As shown in FIG. 10, oxidant flow field plate 510 has formed therein serpentine channels 512 extending between an oxidant stream inlet 562 and a diagonally opposed oxidant stream outlet 564. In operation, the region within the broken lines designated by the numeral 516 is the region of oxidant flow field plate 510 having the highest concentration of oxygen (and also the lowest water content). The region within the broken lines designated by the numeral 518 is the region of oxidant flow field plate 510 having the lowest concentration of oxygen (and also the highest water content).

As further shown in FIG. 10, fuel flow field plate 530 has formed therein serpentine channels 532 extending between a fuel stream inlet 566 and a diagonally opposed fuel stream outlet 568. In operation, channels 532 direct the fuel stream to a region of the fuel flow field plate 530 which substantially coincides with region 518 of oxidant flow field plate 510, in which the oxidant stream has the lowest concentration of oxygen (and also the highest water content). Channels 532 subsequently direct the fuel stream to a region of the fuel flow field plate 530 which substantially coincides with the region 516 of oxidant flow field plate 510, in which the oxidant stream has the highest concentration of oxygen (and also the lowest water content).

As further shown in FIG. 10, coolant flow field plate 550 has formed therein serpentine channels 552 extending between a coolant stream inlet 572 and a coolant stream outlet 570. In operation, the region within the broken lines designated by the numeral 556 is the coolest region of coolant flow field plate 550, and the region within the broken lines designated by the numeral 558 is the warmest region of coolant flow field plate 550. In operation, channels 552 direct the coolant stream such that the coolest region 556 of coolant flow field plate 550 substantially coincides with the region 516 of oxidant flow field plate 510 in which the oxidant stream has the highest concentration of oxygen (and also the lowest water content). Channels 552 also direct the coolant stream such that the warmest region 558 of coolant flow field plate 550 substantially coincides with the region 518 oxidant flow field plate 510 in which the oxidant stream has the lowest concentration of oxygen (and also the highest water content).

Figure 11:
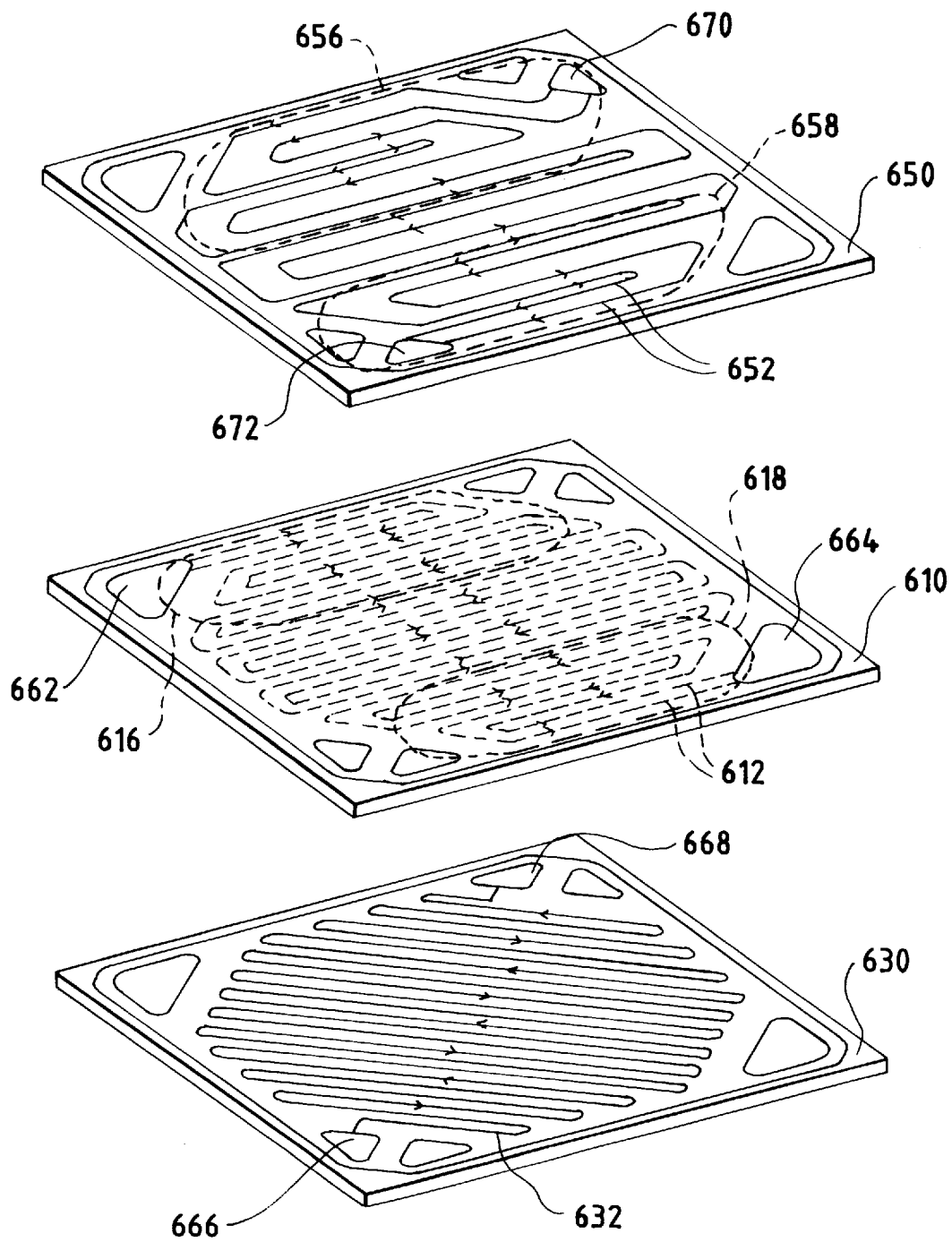
FIG. 11 is an exploded perspective view of a portion of a fuel cell stack showing the relative flow paths of the fuel, oxidant and coolant streams in a third embodiment of a fuel cell assembly with concurrent flow of coolant and oxidant streams and countercurrent flow of fuel and oxidant streams.

FIG. 11 shows an exploded perspective view of a portion of a third embodiment of a fuel cell assembly which includes an oxidant flow field plate 610, a fuel flow field plate 630, and a coolant flow field plate 650. In actuality, the illustrated coolant and oxidant flow fields are formed on opposite sides of the same plate, are shown as being formed on separate plates in FIG. 11 for ease of illustration. Also, for clarity, fewer channels are shown on each flow field plate than are typically present in actuality.

As shown in FIG. 11, oxidant flow field plate 610 has formed therein serpentine channels 612 extending between an oxidant stream inlet 662 and a diagonally opposed oxidant stream outlet 664. In operation, the region within the broken lines designated by the numeral 616 is the region of oxidant flow field plate 610 having the highest concentration of oxygen (and also the lowest water content). The region within the broken lines designated by the numeral 618 is the region of oxidant flow field plate 610 having the lowest concentration of oxygen (and also the highest water content).

As further shown in FIG. 11, fuel flow field plate 630 has formed therein a serpentine channel 632 extending between a fuel stream inlet 666 and a diagonally opposed fuel stream outlet 668. In operation, channel 632 directs the fuel stream to a region of the fuel flow field plate 630 which substantially coincides with region 618 of oxidant flow field plate 610, in which the oxidant stream has the lowest concentration of oxygen (and also the highest water content). Channel 632 subsequently directs the fuel stream to a region of the fuel flow field plate 630 which substantially coincides with the region 616 of oxidant flow field plate 610, in which the oxidant stream has the highest concentration of oxygen (and also the lowest water content).

As further shown in FIG. 11, coolant flow field plate 650 has formed therein serpentine channels 652 extending between a coolant stream inlet 672 and a diagonally opposed coolant stream outlet 670. In operation, the region within the broken lines designated by the numeral 656 is the coolest region of coolant flow field plate 650, and the region within the broken lines designated by the numeral 658 is the warmest region of coolant flow field plate 650. In operation, channels 652 direct the coolant stream such that the coolest region 656 of coolant flow field plate 650 substantially coincides with the region 616 of oxidant flow field plate 610 in which the oxidant stream has the highest concentration of oxygen (and also the lowest water content). Channels 652 also direct the coolant stream such that the warmest region 658 of coolant flow field plate 650 substantially coincides with the region 618 oxidant flow field plate 610 in which the oxidant stream has the lowest concentration of oxygen (and also the highest water content).

Figure 12:
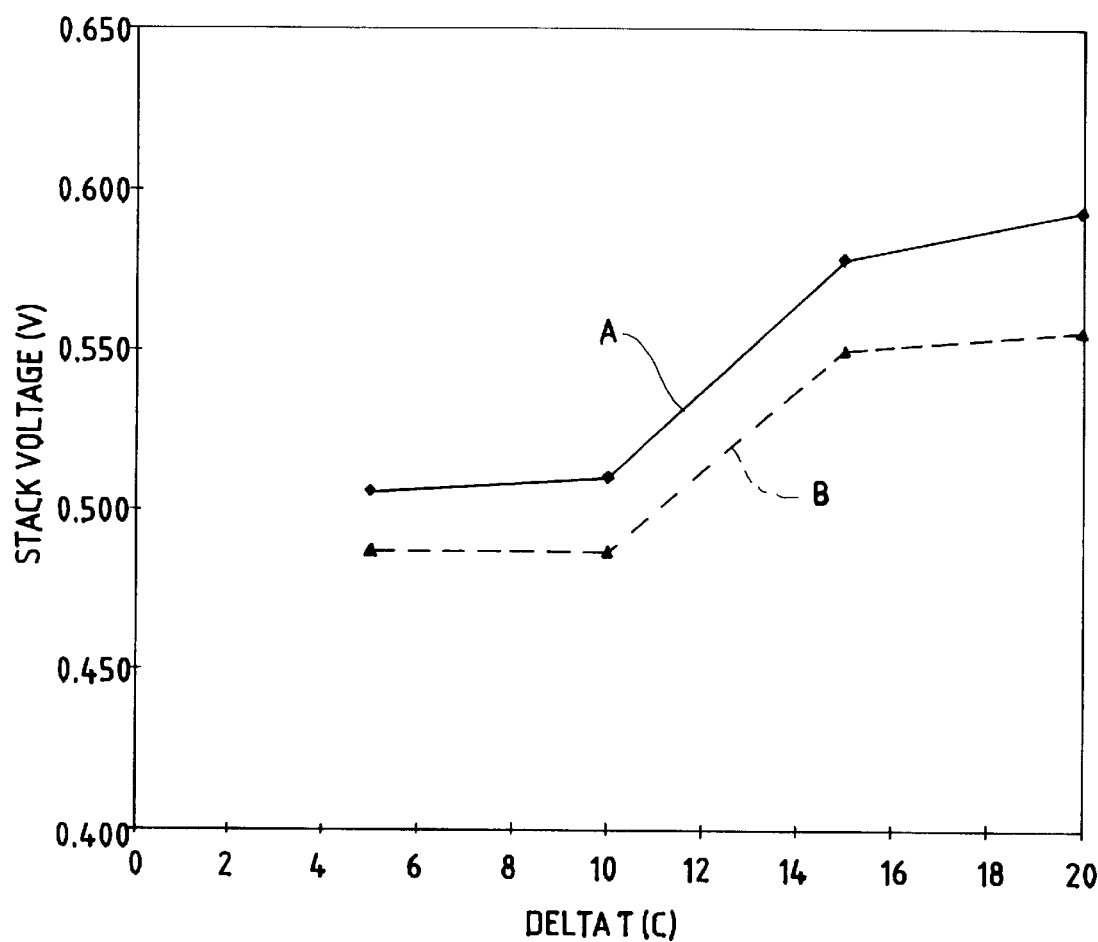
FIG. 12 is a plot of average cell voltage versus the magnitude of the temperature increase of the coolant stream between the coolant stream inlet and the coolant stream outlet in a fuel cell stack with concurrent flow of coolant and oxidant streams in combination with countercurrent flow of fuel and oxidant streams (plot A) and concurrent flow of fuel and oxidant streams (plot B).

FIG. 12 is a plot of average cell voltage versus the magnitude of the temperature difference of the coolant stream between the coolant stream inlet and the coolant stream outlet (the temperature being greater at the outlet) in a fuel cell stack with concurrent flow of coolant and oxidant streams in combination with countercurrent flow of fuel and oxidant streams (plot A) and concurrent flow of fuel and oxidant streams (plot B). The data were obtained on a 4-cell stack, operating on substantially pure hydrogen as the fuel, and air as the oxidant stream, with concurrent flow of oxidant and coolant. The operating conditions were as follows:

current density=1000 amps/ft$^2$;
inlet reactant gas pressure: 30psig for oxidant and fuel;
coolant stream inlet temperature:
75° C. at delta T=5–15° C.,
70° C. at delta T=20° C.;
inlet relative humidity: 80% for oxidant and fuel.

FIG. 12 shows that the fuel cell stack with concurrent flow of coolant and oxidant streams in combination with countercurrent flow of fuel and oxidant streams (plot A) exhibited superior performance at each of the temperature differentials tested in comparison to the fuel cell stack with concurrent flow of coolant and oxidant streams in combination with concurrent flow of fuel and oxidant streams (plot B).

Figure 13:
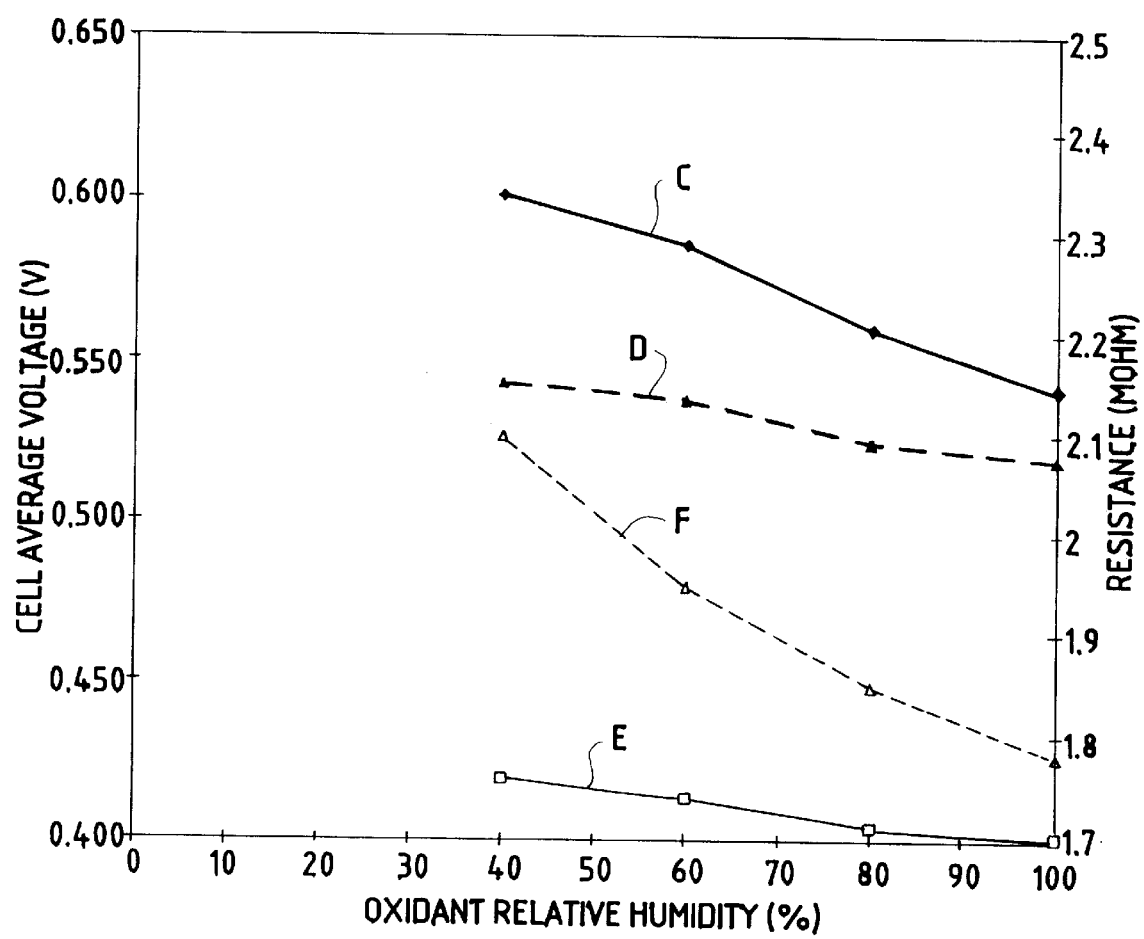
FIG. 13 is a composite plot of average cell voltage versus oxidant stream inlet relative humidity in a fuel cell stack with concurrent flow of coolant and oxidant streams in combination with countercurrent flow of fuel and oxidant streams (plot C) and concurrent flow of fuel and oxidant streams (plot D), and average plate-to-plate resistance versus oxidant stream inlet relative humidity in a fuel cell stack with concurrent flow of coolant and oxidant streams in combination with countercurrent flow of fuel and oxidant streams (plot E) and concurrent flow of fuel and oxidant streams (plot F).

FIG. 13 is a composite plot of average cell voltage versus oxidant stream inlet relative humidity in a fuel cell stack with concurrent flow of coolant and oxidant streams in combination with countercurrent flow of fuel and oxidant streams (plot C) and concurrent flow of fuel and oxidant streams (plot D), and average plate-to-plate resistance versus oxidant stream inlet relative humidity in a fuel cell stack with concurrent flow of coolant and oxidant streams in combination with countercurrent flow of fuel and oxidant streams (plot E) and concurrent flow of fuel and oxidant streams (plot F). The data were obtained on a 4-cell stack, operating on substantially pure hydrogen as the fuel, and with air as the oxidant stream, with concurrent flow of coolant and oxidant streams. The operating conditions were as follows:

current density=1000 amps/ft$^2$;
inlet reactant gas pressure: 30 psig for oxidant and fuel;
coolant stream inlet temperature: 80° C.;
coolant stream outlet temperature: 90° C.;
fuel inlet relative humidity: 80%.

FIG. 13 shows that the fuel cell stack with countercurrent flow of fuel and oxidant streams (plot C) exhibited superior performance, at all oxidant inlet relative humidity values tested, in comparison to the fuel cell stack with concurrent flow of fuel and oxidant streams (plot D), and particularly at lower oxidant inlet relative humidity. For both flow configurations performance decreased as the inlet oxidant relative humidity increased, possibly indicating mass transport effects (flooding) in some regions of the cathode layer when the relative humidity of the inlet air increased. However, the resistance of the cell increased as the relative humidity of the inlet air decreased, which can lead to ohmic losses in performance.

As further shown in FIG. 13, the dramatic increase in resistance observed at low oxidant inlet relative humidities in the fuel cell stack with concurrent flow of fuel and oxidant streams (plot F) can be attributed to drying of the cell in the reactant stream inlet region. Plot E illustrates that this drying can be alleviated by operating the fuel cell stack with countercurrent flow of fuel and oxidant streams.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. An electrochemical fuel cell stack comprising at least one fuel cell assembly, said assembly comprising:

A. at least one fuel cell comprising:
1. an anode layer comprising at least one fuel stream inlet, at least one fuel stream outlet, and means for flowing a fuel stream from said at least one fuel stream inlet to said at least one fuel stream outlet;
2. a cathode layer comprising at least one oxidant stream inlet, at least one oxidant stream outlet, and means for flowing an oxidant stream from said at least one oxidant stream inlet to said at least one oxidant stream outlet, said oxidant stream comprising oxygen and water formed by the electrochemical reaction of said fuel and said oxygen;
3. an electrolyte interposed between said anode layer and said cathode layer; and B. a cooling layer disposed adjacent said cathode layer, said cooling layer comprising at least one coolant stream inlet, at least one coolant stream outlet, and means for flowing a coolant stream from said at least one coolant stream inlet to said at least one coolant stream outlet;

wherein said coolant stream flowing means directs said coolant stream such that the coolest region of said cooling layer substantially coincides with the region of said cathode layer in which said oxidant stream has the lowest water content, and the warmest region of said cooling layer substantially coincides with the region of said cathode layer in which said oxidant stream has the highest water content; and wherein said fuel stream flowing means directs said fuel stream to a region of said anode layer which substantially coincides with the region of said cathode layer in which said oxidant stream has the highest water content and subsequently directs said fuel stream to a region of said anode layer which substantially coincides with the region of said cathode layer in which said oxidant stream has the lowest water content.

2. The electrochemical fuel cell stack of claim 1 wherein said electrolyte is an ion exchange membrane.

3. The electrochemical fuel cell stack of claim 1 wherein said fuel stream comprises hydrogen.

4. The electrochemical fuel cell stack of claim 1 wherein one of said at least one fuel stream outlet and said at least one oxidant stream outlet is centrally disposed in said anode layer or said cathode layer, respectively, and the other of said at least one fuel stream outlet and said at least one oxidant stream outlet is peripherally disposed in said anode layer or said cathode layer, respectively.

5. The electrochemical fuel cell stack of claim 1 wherein said fuel stream flowing means comprises at least one channel formed in said anode layer for directing said fuel stream from said at least one fuel stream inlet to said at least one fuel stream outlet and wherein said oxidant stream flowing means comprises at least one channel formed in said cathode layer for directing said oxidant stream from said at least one oxidant stream inlet to said at least one oxidant stream outlet.

6. The electrochemical fuel cell stack of claim 5 wherein said at least one fuel stream channel comprises a plurality of fuel stream channels extending between said at least one fuel stream inlet and said at least one fuel stream outlet and said at least one oxidant stream channel comprises a plurality of oxidant stream channels extending between said at least one oxidant stream inlet and said at least one oxidant stream outlet.

7. The electrochemical fuel cell stack of claim 5 wherein said at least one fuel stream channel traverses said anode layer in a plurality of serpentine passes and said at least one oxidant stream channel traverses said cathode layer in a plurality of serpentine passes.

8. The electrochemical fuel cell stack of claim 5 wherein said at least one fuel stream channel and said at least one oxidant stream channel extend such that said at least one fuel stream channel and said at least one oxidant stream channel substantially coincide, whereby said fuel stream and said oxidant stream flow countercurrently along their respective lengths.

9. The electrochemical fuel cell stack of claim 7 wherein said at least one fuel stream channel and said at least one oxidant stream channel extend such that said at least one fuel stream channel is disposed between sequential passes of said oxidant stream channel along the length of said fuel stream channel.

10. The electrochemical fuel cell stack of claim 5 wherein said anode layer comprises:
   a. an electrically conductive, substantially fluid impermeable anode fluid flow field plate having formed therein, on the surface thereof facing said electrolyte, said at least one fuel stream channel; and
   b. a first sheet of porous electrically conductive material interposed between said anode fluid flow field plate and said electrolyte, and a quantity of electrocatalyst disposed between said electrolyte and said first sheet;
and wherein said cathode layer comprises:
   c. an electrically conductive, substantially fluid impermeable cathode fluid flow field plate having formed therein, on the surface thereof facing said electrolyte, said at least one oxidant stream channel; and
   d. a second sheet of porous electrically conductive material interposed between said cathode fluid flow field plate and said electrolyte, and a quantity of electrocatalyst disposed between said electrolyte and said second sheet.

11. The electrochemical fuel cell stack of claim 1 wherein said anode layer comprises:
   a. an electrically conductive, substantially fluid impermeable anode separator plate; and
   b. a first sheet of porous electrically conductive material interposed between said anode separator plate and said electrolyte, and a quantity of electrocatalyst disposed between said electrolyte and said first sheet, said first sheet having formed therein, on the surface thereof facing said anode separator plate, said at least one fuel stream channel;
and wherein said cathode layer comprises:
   c. an electrically conductive, substantially fluid impermeable cathode separator plate; and
   d. a second sheet of porous electrically conductive material interposed between said cathode separator plate and said electrolyte, and a quantity of electrocatalyst disposed between said electrolyte and said second sheet, said second sheet having formed therein, on the surface thereof facing said cathode separator plate, said at least one oxidant stream channel.

12. The electrochemical fuel cell stack of claim 1 wherein said anode layer comprises a first sheet of porous electrically conductive material and said fuel stream flowing means comprises the interstices of said first porous material sheet and wherein said cathode layer comprises a second sheet of porous electrically conductive material and said oxidant stream flowing means comprises the interstices of said second porous material sheet.

13. The electrochemical fuel cell stack of claim 12 wherein said porous sheet material is carbon fiber paper.

14. An electrochemical fuel cell stack comprising at least one fuel cell assembly, said assembly comprising:
   A. at least one fuel cell comprising:
      1. an anode layer comprising at least one fuel stream inlet, at least one fuel stream outlet, and means for flowing a fuel stream from said at least one fuel stream inlet to said at least one fuel stream outlet;
      2. a cathode layer comprising at least one oxidant stream inlet, at least one oxidant stream outlet, and means for flowing a oxidant stream from said at least one oxidant stream inlet to said at least one oxidant stream outlet, said oxidant stream comprising oxygen;
      3. an electrolyte interposed between said anode layer and said cathode layer; and
   B. a cooling layer disposed adjacent said cathode layer, said cooling layer comprising at least one coolant stream inlet, at least one coolant stream outlet, and means for flowing a coolant stream from said at least one coolant stream inlet to said at least one coolant stream outlet;
wherein said coolant stream flowing means directs said coolant stream such that the coolest region of said cooling layer substantially coincides with the region of said cathode layer in which said oxidant stream has the highest concentration of oxygen, and the warmest region of said cooling layer substantially coincides with the region of said cathode layer in which said oxidant stream has the lowest concentration of oxygen; and wherein said fuel stream flowing means directs said fuel stream to a region of said anode layer which substantially coincides with the region of said cathode layer in which said oxidant stream has the lowest concentration of oxygen and subsequently directs said fuel stream to a region of said anode layer which substantially coincides with the region of said cathode layer in which said oxidant stream has the highest concentration of oxygen.

15. The electrochemical fuel cell stack of claim 14 wherein said electrolyte is an ion exchange membrane.

16. The electrochemical fuel cell stack of claim 14 wherein said fuel stream comprises hydrogen and said oxidant stream comprises air.

17. A method of controlling the water content of an oxidant stream in a cathode layer of an electrochemical fuel cell assembly, said assembly comprising a cooling layer adjacent said cathode layer, said cooling layer comprising a coolant stream inlet, a coolant stream outlet, and means for flowing a coolant stream from said at least one coolant stream inlet to said at least one coolant stream outlet, said assembly further comprising an anode layer comprising a fuel stream inlet, a fuel stream outlet, and means for flowing a fuel stream from said at least one fuel stream inlet to said at least one fuel stream outlet, the method comprising:

a. flowing said coolant stream such that the coolest region of said cooling layer substantially coincides with the region of said cathode layer in which said oxidant stream has the lowest water content and the warmest region of said cooling layer substantially coincides with the region of said cathode layer in which said oxidant stream has the highest water content; and b. flowing said fuel stream such that said fuel stream is directed to a region of said anode layer which substantially coincides with the region of said cathode layer in which said oxidant stream has the highest water content and is subsequently directed to a region of said anode layer which substantially coincides with the region of said cathode layer in which said oxidant stream has the lowest water content.

18. A method of controlling the water content of the oxidant stream in a cathode layer of an electrochemical fuel cell assembly, said oxidant stream comprising oxygen, said assembly comprising a cooling layer adjacent said cathode layer, said cooling layer comprising a coolant stream inlet, a coolant stream outlet, and means for flowing a coolant stream from said at least one coolant stream inlet to said at least one coolant stream outlet, said assembly further comprising an anode layer comprising a fuel stream inlet, a fuel stream outlet, and means for flowing a fuel stream from said at least one fuel stream inlet to said at least one fuel stream outlet, the method comprising:

a. flowing said coolant stream such that the coolest region of said cooling layer substantially coincides with the region of said cathode layer in which said oxidant stream has the highest concentration of oxygen and the warmest region of said cooling layer substantially coincides with the region of said cathode layer in which said oxidant stream has the lowest concentration of oxygen; and b. flowing said fuel stream such that said fuel stream is directed to a region of said anode layer which substantially coincides with the region of said cathode layer in which said oxidant stream has the lowest concentration of oxygen and is subsequently directed to a region of said anode layer which substantially coincides with the region of said cathode layer in which said oxidant stream has the highest concentration of oxygen.

* * * * *